United States Patent
Holz et al.

[11] Patent Number: 6,099,595
[45] Date of Patent: Aug. 8, 2000

[54] PROCESS FOR THE PREPARATION OF CRYSTALLINE SODIUM SILICATES

[75] Inventors: Josef Holz; Günther Schimmel, both of Erftstadt; Alexander Tapper, Mönchengladbach; Volker Thewes, Monheim, all of Germany

[73] Assignee: Clariant GmbH, Frankfurt, Germany

[21] Appl. No.: 09/027,891

[22] Filed: Feb. 23, 1998

[30] Foreign Application Priority Data

Feb. 25, 1997 [DE] Germany .................... 197 07 449

[51] Int. Cl.[7] .................... B01D 9/00; C01D 1/30; C01D 33/00; C01D 33/20; C01D 33/32
[52] U.S. Cl. .................... 23/295 R; 23/302 R; 23/302 T; 423/332; 423/333
[58] Field of Search ................ 423/332, 333, 423/334, 324, 325, 326; 23/295 R, 300, 302 T, 302 R

[56] References Cited

U.S. PATENT DOCUMENTS

| | | | |
|---|---|---|---|
| 4,585,642 | 4/1986 | Rieck | 423/333 |
| 4,806,327 | 2/1989 | Rieck et al. | 423/332 |
| 5,183,651 | 2/1993 | Schimmel | 423/334 |
| 5,211,930 | 5/1993 | Schimmel | 423/333 |
| 5,229,095 | 7/1993 | Schimmel et al. | 423/334 |
| 5,236,682 | 8/1993 | Schimmel | 423/334 |
| 5,268,156 | 12/1993 | Schimmel | 423/334 |
| 5,308,596 | 5/1994 | Kotzian | 423/333 |
| 5,356,607 | 10/1994 | Just | 423/334 |

FOREIGN PATENT DOCUMENTS

| | | | |
|---|---|---|---|
| 0 293 640 B1 | 5/1988 | European Pat. Off. | C01B 33/32 |
| 0 436 835 A2 | 12/1990 | European Pat. Off. | C01B 33/32 |
| 0 502 325 A1 | 2/1992 | European Pat. Off. | C01B 33/32 |
| 0 548 599 A1 | 12/1992 | European Pat. Off. | C01B 33/34 |
| 0 425 428 B1 | 12/1993 | European Pat. Off. | C01B 33/32 |

OTHER PUBLICATIONS

European Search Report.
Alexander Willgallis et al.: "Zur Polymorphie des Na2Si2O5" Glastechnische Berichte., Apr. 1964, Frankfurt DE Seiten 194–200, XP002066304.

*Primary Examiner*—Gary P. Straub
*Assistant Examiner*—Eileen E. Nave
*Attorney, Agent, or Firm*—Miles B. Dearth

[57] ABSTRACT

The invention relates to a process for the preparation of crystalline sodium silicates having a sheet structure and high δ phase content from water glass, which has been prepared hydrothermally, by dehydration of the water glass and subsequent crystallization at elevated temperature, which comprises treating the water glass at temperatures of from 50 to 140° C. prior to dehydration.

9 Claims, No Drawings

PROCESS FOR THE PREPARATION OF CRYSTALLINE SODIUM SILICATES

The invention relates to a process for the preparation of crystalline sodium silicates having a sheet structure and high δ phase content from water glass, which has been prepared hydrothermally, by dehydration of the water glass and subsequent crystallization at elevated temperature.

Crystalline sodium silicates having a sheet structure are used as water softeners and builders in detergent and cleaning compositions. Crystalline sodium silicates having a sheet structure, in particular those having an $SiO_2:Na_2O$ molar ratio of (1.9 to 2.1):1, are suitable for this purpose. These are also referred to as SKS-6 grades. Depending on the preparation and crystallization conditions, there are several modifications of this sodium silicate, referred to as α, β, γ and δ phases. For the above applications, the δ modification (SKS-6) is of particular interest.

The prior art already discloses a series of processes which can be used to prepare crystalline sodium silicates having a sheet structure.

EP-B-0 293 640 describes a process for the preparation of crystalline sodium silicates having a sheet structure and an $SiO_2:Na_2O$ molar ratio of 1.9:1 to 3.5:1 from a water glass solution having a solids content of from 20 to 65% by weight, which comprises treating the water glass solutions in a spray-drying zone to form a pulverulent amorphous sodium silicate having a maximum ignition loss of 20% by weight, the waste gas leaving the spray-drying zone having a temperature of at least 140° C., and then heat-treating the spray-dried sodium silicate in an ignition zone containing an agitated fixed bed at temperatures of from 500 to 800° C. for from 1 to 60 minutes in the presence of at least 10% by weight of a recovered product which has been obtained by mechanical comminution of crystalline sodium silicate discharged from the ignition zone. It is a disadvantage of this process that a high δ phase content is obtained in a trouble-free operation only if a sufficiently large amount of the recovered product is re-used. As a result, the process becomes complex.

EP 0 425 428 B1 likewise describes a process for the preparation of crystalline sodium silicates having a sheet structure and the aforementioned molar ratio and also a water content of less than 0.3% by weight from a water glass solution having at least 20% by weight of solids, which comprises obtaining the water glass solution by reacting quartz sand with sodium hydroxide solution, treating the water glass solution in a spray-drying zone at 200 to 300° C. and for a residence time of from 10 to 25 seconds, the temperature of the waste gas leaving the spray-drying zone being from 90 to 130° C., to form a pulverulent sodium silicate, which is then introduced into an inclined rotary kiln fitted with a solids agitation device and treated countercurrently with flue gas at temperatures of from 500 to 850° C. for a period of up to 60 minutes to form crystalline sodium silicate.

The rotary kiln is insulated in such a way that the temperature of its outer wall is less than 60° C. The crystalline sodium silicate leaving the rotary kiln is comminuted to particle sizes of from 0.1 to 12 mm using a mechanical crusher. The sodium silicate obtained by this process is mainly present in the δ modification.

A process for the preparation of crystalline sodium silicates having a sheet structure from sand and soda is described in EP-A-0 436 835. This involves melting sand and soda in an $SiO_2:Na_2O$ molar ratio of 2 to 3.5 at temperatures of from 1200 to 1400° C., cooling the melt, grinding the lumpy water glass formed to particle sizes of less than 2 mm and then treating the granules at from 600 to 800° C. in an elongate reaction zone with mechanical circulation for from 10 to 120 minutes and subsequently grinding them to a particle fineness of less than 1 mm. This process mainly produces $\alpha\text{-}Na_2Si_2O_5$.

EP-A-0 502 325 describes a process similar to that in EP-A-0 425 428, except that a spray-dried pulverulent amorphous sodium silicate is ground before being introduced into the rotary kiln. In this process the waste gas leaving the rotary kiln has only a low dust content and the rotary kiln can be filled to a greater degree.

A further process variant, described in EP-A-0 548 509, is the process already described in EP-A-0 425 428, the difference being that the spray-dried pulverulent amorphous sodium disilicate is ground and, after grinding, is introduced into a rotary kiln, which is fitted with a solids agitation device and is heated externally via the wall and has several different internal temperature zones, and treated therein at temperatures of from 400 to 800° C. for from 1 to 60 minutes to form crystalline sodium disilicate. The product obtained is mainly the δ modification of $Na_2Si_2O_5$.

A disadvantage of all the above processes is that it is very difficult to prepare, under reproducible conditions, $Na_2Si_2O_5$ which consists of virtually 100% of the δ modification. Even a series of involved process steps is unable to achieve this aim completely.

The object of the present invention is, therefore, to provide a process for reproducibly preparing crystalline sodium silicates having a sheet structure and an $SiO_2:Na_2O$ molar ratio of (1.9 to 2.1):1. The sheet silicate should have as high a δ phase content as possible.

This object is achieved by a process of the type described at the beginning, which comprises treating the water glass at temperatures of from 50 to 140° C. prior to dehydration.

The water glass is preferably treated for from 2 to 100 hours.

The water glass is particularly preferably treated for from 25 to 50 hours.

The water glass is preferably treated at temperatures of from 70 to 110° C.

The solids content of the water glass is preferably from 20 to 65% by weight.

The water glass mixture is preferably dehydrated to give an amorphous sodium disilicate.

The amorphous sodium disilicate preferably has an ignition loss of from 10 to 25% by weight at 720° C.

Dehydration is preferably carried out in a hot-air spray tower.

The amorphous sodium disilicate is preferably crystallized at temperatures of at least 450° C., but below its melting point.

Crystallization is preferably carried out at temperatures of from 600 to 800° C.

The invention also relates to the use of crystalline sheet silicates prepared by the process according to the invention for producing detergent, cleaning and dishwashing compositions.

In the following examples, an X-ray diffraction pattern of each sample is recorded and the X-ray reflections at the following d values are used for calculating the phase distribution:

| Angle [° 2 theta] | d value α1 [Å] |
|---|---|
| 25.802 | 3.45 |
| 27.997 | 3.30 |
| 30.063 | 2.97 |
| 30.698 | 2.91 |
| 31.474 | 2.84 |
| 36.040 | 2.49 |

The intensities of the X-ray reflections are inserted in the usual manner into the empirically determined formulae below (I=intensity, tot.=total):

Intensity (total)=I(3.30)+I(2.97)*1.8+[I(3.45)+I(2.91)+I(2.84)+I(2.49)]*1.89

α phase content in %=[I(3.30)*100]/tot. I

β phase content in %=[I(2.97)*180]/tot. I

δ phase content in %={[I(3.45)+I(2.91)+I(2.84)+I(2.49)]*189}/tot. I

EXAMPLE 1 (comparative example)

1.77 kg of quartz sand were slurried with 1.2 kg of water, and 2.2 kg of 50% strength sodium hydroxide solution were added thereto. This reaction mixture was then heated to 195° C. in a stirred autoclave by condensing in steam to a pressure of 16 bar over the course of 70 minutes and held at the pressure corresponding to 195° C. for 110 minutes. The pressure was then released over the course of 120 minutes and the contents of the autoclave were then filtered until clear (filtration auxiliary: Clarcel DIC kieselguhr from Atochem). This gave a water glass having a molar modulus ($SiO_2/Na_2O$ ratio) of 2.03 and a solids content of 47.2% by weight. 400 g of this water glass solution were dehydrated in a laboratory hot-air spray tower (inlet temperature 220° C., outlet gas temperature 120° C.) to give an amorphous sodium disilicate having an ignition loss of 17.5% by weight at 620° C. 8 g of the amorphous sodium disilicate were then heat-treated for 1 h in a muffle furnace at 620° C. and then rapidly cooled. The X-ray reflections (position and intensity) required for the phase calculation are given in Table 1. According to the above formulae, the percentage distribution among the crystalline phases is:

α phase content: 4.5%
β phase content: 44.3%
δ phase content: 51.2%

EXAMPLE 2 (comparative example)

1.77 kg of quartz sand were slurried with 1.2 kg of water, and 2.2 kg of 50% strength sodium hydroxide solution were added thereto. This reaction mixture was then heated to 205° C. in a stirred autoclave by condensing in steam to a pressure of 16 bar over the course of 80 minutes and held for 90 minutes at the pressure corresponding to 205° C. The pressure was then released over the course of 100 minutes and the contents of the autoclave were then filtered until clear as in Example 1. This gave a water glass having a molar modulus ($SiO_2/Na_2O$ ratio) of 2.02 and a solids content of 46.7% by weight. 400 g of this water glass solution were dehydrated in a laboratory hot-air spray tower (inlet temperature 220° C., outlet gas temperature 120° C.) to give an amorphous sodium disilicate having an ignition loss of 16.4% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 4.8%
β phase content: 31.0%
δ phase content: 64.2%

EXAMPLE 3 (comparative example)

1.44 kg of quartz sand were slurried with 1.49 kg of water, and 1.82 kg of 50% strength sodium hydroxide solution were added thereto. This reaction mixture was then heated to 210° C. in a stirred autoclave with electrical heating and maintained at the pressure corresponding to 210° C. for 90 minutes. The mixture was then cooled to 50° C. and heat-treated at this temperature for 1 h. The contents of the autoclave were filtered until clear as in Example 1. This gave a water glass having a molar modulus of 1.996 and a solids content of 44.69% by weight. 400 g of this water glass solution were dehydrated in a laboratory hot-air spray tower (inlet temperature 220° C., outlet gas temperature 120° C.) to give an amorphous sodium disilicate having an ignition loss of 15% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the 3 crystalline phases is:

α phase content: 17.6%
β phase content: 42.6%
δ phase content: 39.8%

EXAMPLE 4 (according to the invention)

1.77 kg of quartz sand were slurried with 1.2 kg of water, and 2.2 kg of 50% strength sodium hydroxide solution were added thereto. This reaction mixture was then heated to 195° C. in a stirred autoclave by condensing in steam to a pressure of 16 bar over the course of 70 minutes and held for 110 minutes at the pressure corresponding to 195° C. The pressure was then released over the course of 120 minutes and the contents of the autoclave were then filtered until clear as in Example 1. This gave a water glass having a molar modulus of 2.03 and a solids content of 47.2% by weight. The water glass solution was then heat-treated at 110° C. for 48 h. 400 g of this heat-treated water glass solution were dehydrated in a laboratory hot-air spray tower (inlet temperature 220° C., outlet gas temperature 120° C.) to give an amorphous sodium disilicate having an ignition loss of 16.2% by weight at 620° C. 8 g of the amorphous sodium disilicate were then heat-treated for 1 h in a muffle furnace at 620° C. and then rapidly cooled. The X-ray reflections (position and intensity) required for the phase calculation are given in Table 1. According to the above formulae, the percentage distribution among the crystalline phases is:

α phase content: 1.0%
β phase content: 5.5%
δ phase content: 93.5%

EXAMPLE 5 (according to the invention)

1.77 kg of quartz sand were slurried with 1.2 kg of water, and 2.2 kg of 50% strength sodium hydroxide solution were added thereto. This reaction mixture was then heated to 205° C. in a stirred autoclave by condensing in steam to a pressure of 16 bar over the course of 80 minutes and held for 90 minutes at the pressure corresponding to 205° C. The pressure was then released over the course of 100 minutes and the contents of the autoclave were then filtered until clear as in Example 1. This gave a water glass having a molar modulus of 2.02 and a solids content of 46.7% by weight. The water glass solution was then heat-treated at 110° C. for 48 h. 400 g of this water glass solution were dehydrated in a laboratory hot-air spray tower (inlet temperature 220° C., outlet gas temperature 120° C.) to give an amorphous sodium disilicate having an ignition loss of 16.6% by weight at 720° C. 8 g of the amorphous disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 1.1%
β phase content: 0.0%
δ phase content: 98.9%

EXAMPLE 6 (according to the invention)

A water glass prepared as in Example 3 was then heat-treated at 110° C. for 48 h. 400 g of this heat-treated water glass solution were dehydrated in a laboratory hot-air spray tower (inlet temperature 220° C., outlet gas temperature 120° C.) to give an amorphous sodium disilicate having an ignition loss of 16% by weight at 720° C. 8 g of the amorphous sodium disilicate were then heat-treated for 1 h in a muffle furnace at 720° C. and then rapidly cooled. The X-ray reflections (position and intensity) required for the phase calculation are given in Table 1. According to the above formulae, the percentage distribution among the crystalline phases is:

α phase content: 6.8%
β phase content: 8.2%
δ phase content: 85.0%

EXAMPLES 7 TO 19

Examples 7 to 19 were carried out as in Example 2, the data in Table 2 for Example 7 being based on pure water glass.

TABLE 1

X-ray reflections for Examples 1 to 6

| Example | Rel. intensity [%] at dα1 3.45 | Rel. intensity [%] at dα1 3.30 | Rel. intensity [%] at dα1 2.97 | Rel. intensity [%] at dα1 2.91 | Rel. intensity [%] at dα1 2.84 | Rel. intensity [%] at dα1 2.49 |
|---|---|---|---|---|---|---|
| 1 | 6.9 | 6.6 | 36 | 8.5 | 12.8 | 11.5 |
| 2 | 6.9 | 6.2 | 22.2 | 9.2 | 15.5 | 12.1 |
| 3 | 6.1 | 29.9 | 40.2 | 7.3 | 13.7 | 8.7 |
| 4 | 8.6 | 1 | 3 | 10.2 | 17.2 | 13.1 |
| 5 | 9.9 | 1.1 | 0 | 11.6 | 17.7 | 13.8 |
| 6 | 9.1 | 7.7 | 5.2 | 10.7 | 17.9 | 13.1 |

TABLE 2

Data for Examples 7 to 19

| Example | After-treatment temperature [° C.] | After-treatment time [h] | α phase content [620° C.] | β phase content [620° C.] | δ phase content [620° C.] | α phase content [720° C.] | β phase content [720° C.] | δ phase content [720° C.] |
|---|---|---|---|---|---|---|---|---|
| 7 | (water glass original) | | 4.5 | 44.3 | 51.2 | 8.4 | 25.4 | 66.1 |
| 8 | 50 | 2 | 5.6 | 43.8 | 50.5 | 11.3 | 15.5 | 73.2 |
| 9 | 50 | 25 | 4.3 | 22.1 | 73.6 | 3.6 | 24.5 | 71.9 |
| 10 | 50 | 48 | 4.4 | 19.5 | 76.2 | 7.4 | 5.3 | 87.3 |
| 11 | 80 | 2 | 9.2 | 33.2 | 57.6 | 11.3 | 14.3 | 74.4 |
| 12 | 80 | 25 | 5.9 | 32.7 | 61.4 | 5.7 | 11.7 | 82.6 |
| 13 | 80 | 25 | 6.4 | 24.8 | 68.9 | 7.2 | 21.3 | 71.5 |
| 14 | 80 | 25 | 6.2 | 25.6 | 68.3 | 7.8 | 15.9 | 76.3 |
| 15 | 80 | 25 | 6 | 23.7 | 70.3 | 8.8 | 19.2 | 72 |
| 16 | 80 | 48 | 7.3 | 21.3 | 71.4 | 10.7 | 13 | 76.3 |
| 17 | 110 | 2 | 4.6 | 19.4 | 76 | 4 | 9.5 | 86.5 |
| 18 | 110 | 25 | 1.7 | 9.1 | 89.2 | 5.2 | 0 | 94.8 |
| 19 | 110 | 48 | 1 | 5.5 | 93.5 | 4.2 | 0 | 95.8 |

What is claimed is:

1. In a process for the preparation of crystalline sodium silicates having a sheet structure and high δ phase content from water glass, which has been prepared hydrothermally by an initial heat treatment in an autoclave, followed by dehydration of the water glass and subsequent crystallization at elevated temperature, the improvement which comprises:

after hydrothermal treatment, additionally treating the water glass at temperatures of from 50 to 140° C. for from 2 to 100 hours prior to dehydration.

2. The process as claimed in claim 1, wherein said additional step of treating the water glass, the water glass is held for from 25 to 50 hours.

3. The process as claimed in claim 1, wherein said additional step of treating the water glass is conducted at temperatures of from 70 to 110° C.

4. The process as claimed in claim 1, characterized by a solids content of the water glass is from 20 to 65% by weight.

5. The process as claimed in claim 1, wherein said dehydration of said water glass yields an amorphous sodium disilicate.

6. The process as claimed in claim 5, wherein the amorphous sodium disilicate has an ignition loss of from 10 to 25% by weight at 720° C.

7. The process as claimed in claim 1, wherein said dehydration is conducted in a hot-air spray tower.

8. The process as claimed in claim 1, wherein said crystallization is conducted at temperatures of at least 450° C., but below its melting point.

9. The process as claimed in claim 1, wherein said crystallization is conducted at temperatures of from 600 to 800° C.

* * * * *